United States Patent
Mitson

(10) Patent No.: US 11,011,072 B2
(45) Date of Patent: May 18, 2021

(54) EDUCATIONAL TRAINING SYSTEMS, GAMES, AND METHODS

(71) Applicant: Stephon Jon Mitson, Minneapolis, MN (US)

(72) Inventor: Stephon Jon Mitson, Minneapolis, MN (US)

(*) Notice: Subject to any disclaimer, the term of this patent is extended or adjusted under 35 U.S.C. 154(b) by 326 days.

(21) Appl. No.: 16/041,032

(22) Filed: Jul. 20, 2018

(65) Prior Publication Data

US 2019/0027059 A1 Jan. 24, 2019

Related U.S. Application Data

(60) Provisional application No. 62/535,100, filed on Jul. 20, 2017.

(51) Int. Cl.
| | |
|---|---|
| *G09B 19/00* | (2006.01) |
| *A63B 67/00* | (2006.01) |
| *A63F 7/06* | (2006.01) |
| *A63F 7/30* | (2006.01) |
| *A63B 69/00* | (2006.01) |
| *A63F 1/04* | (2006.01) |
| *A63F 7/00* | (2006.01) |
| *G09B 19/22* | (2006.01) |
| *A63F 3/00* | (2006.01) |

(52) U.S. Cl.
CPC ........ *G09B 19/0023* (2013.01); *A63B 67/002* (2013.01); *A63B 69/00* (2013.01); *A63F 1/04* (2013.01); *A63F 7/00* (2013.01); *A63F 7/0616* (2013.01); *A63F 7/305* (2013.01); *G09B 19/0038* (2013.01); *G09B 19/0061* (2013.01); *G09B 19/22* (2013.01); *A63B 2208/12* (2013.01); *A63F 2001/0408* (2013.01); *A63F 2001/0458* (2013.01); *A63F 2001/0475* (2013.01); *A63F 2003/00798* (2013.01)

(58) Field of Classification Search
CPC ............... G09B 19/00; G09B 19/0023; G09B 19/0038; G09B 19/61; G09B 19/22; A63B 67/00; A63B 67/002; A63B 9/00; A63B 2208/0458; A63B 2208/0475; A63B 2208/00798; A63B 67/06; A63B 63/00; A63B 63/04; A63F 1/04; A63F 2001/0408; A63F 2001/0475; A63F 2001/00798
See application file for complete search history.

(56) References Cited

U.S. PATENT DOCUMENTS

2003/0034611 A1* 2/2003 Lacy ..................... A63F 7/0612
273/317.3

* cited by examiner

*Primary Examiner* — Timothy A Musselman
(74) *Attorney, Agent, or Firm* — Patterson Thuente Pedersen, PA

(57) ABSTRACT

Games and systems for playing those games are described that are non-consequential, intuitively educational, reflective, and physically-interactive. The games can be played by players at a variety of skill levels and ages, using a set of unique cards and signs that direct the players to interact with one another and the game in ways that promote mental and physical development.

9 Claims, 7 Drawing Sheets

EDUCATIONAL TRAINING SYSTEMS, GAMES, AND METHODS

RELATED APPLICATION

The present application claims the benefit of U.S. Provisional Application No. 62/535,100 filed Jul. 20, 2018, which is hereby incorporated herein in its entirety by reference.

TECHNICAL FIELD

Embodiments described herein relate to training or educational games. Such games can be in the form of a method or of a system of cards, objects, and sports equipment.

BACKGROUND

Physical sports such as soccer, hockey, tennis, lacrosse, or croquet are popular among children and can be useful to develop teamwork skills, coordination, and promote physical fitness. These and other benefits of physical education can, however, come with drawbacks. For example, in certain team sports or games children are in competition with one another. In those sports or games, smaller, less athletic, or disabled children can feel inferior due to being picked last or not feeling like he or she has a chance of winning.

Furthermore, young children may not fully comprehend the rules or instructions of a game that was developed for older players. For example, in the game of soccer a player is typically not permitted to pick up a ball. Younger children who do not understand this rule may not be able, without some further training, to benefit from all of the skills that soccer can impart (such as hand-eye coordination) because they are not following that rule.

SUMMARY

Games and systems for playing those games are described that are non-consequential, intuitively educational, reflective, and physically-interactive. The games can be played by players at a variety of skill levels and ages. Combinations of unique and matching signs, labels, and buckets can be used to direct players in ways that direct the players to interact with one another and the game in ways that promote mental and physical development.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

Figure 1:
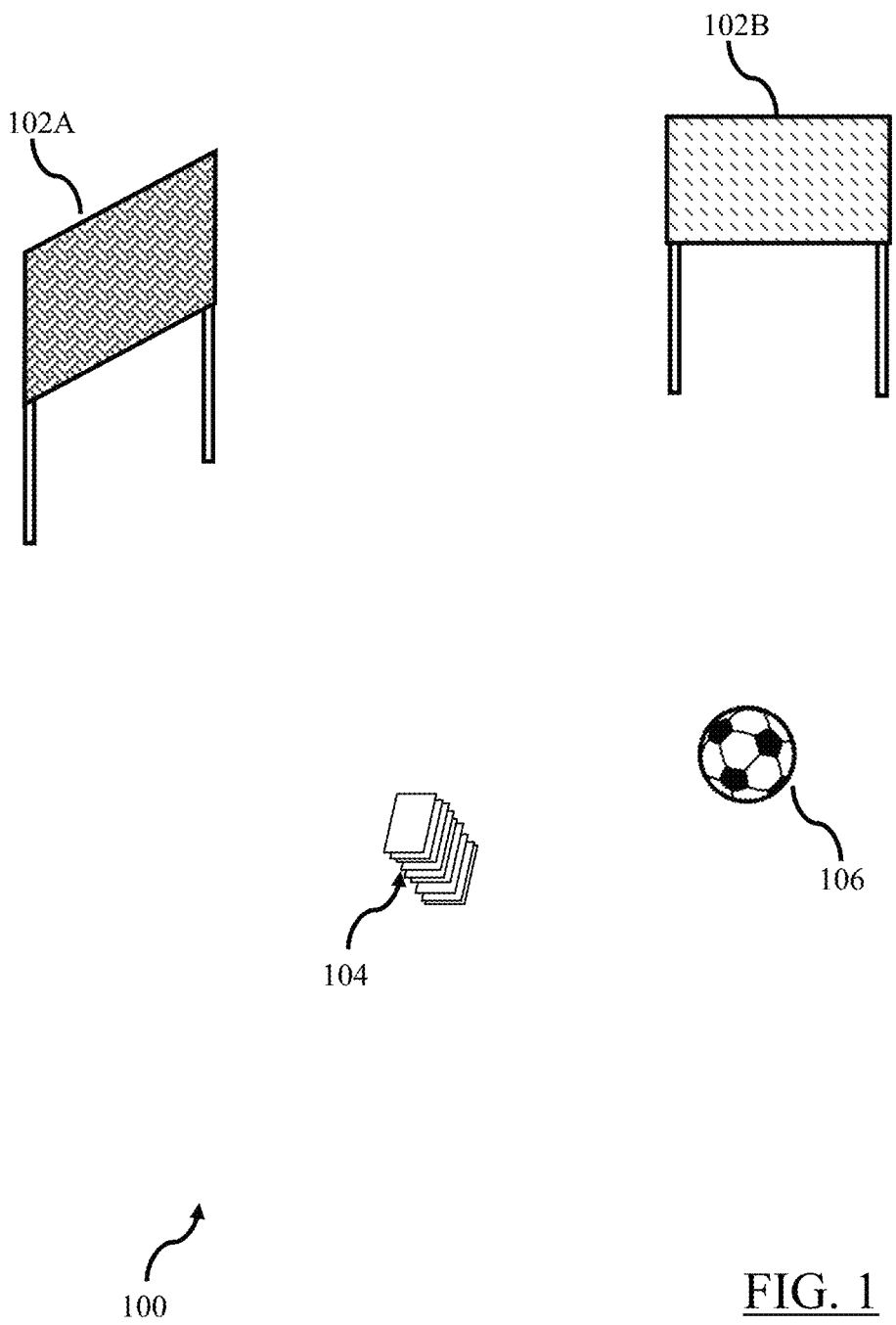
FIG. 1 is a schematic of a system according to an embodiment.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

In embodiments, game systems and methods described herein overcome the deficiencies of conventional games and sports for educating and training young children in a variety of useful skills.

The game systems and methods described herein can be non-consequential, which reduces or eliminates the hardship associated with being called out as a winner or loser of a traditional team-based or individual sport or game.

The game systems and methods described herein can be intuitively educational, to provide classroom-type lesson plans integrated into each game or training session.

The game systems and methods described herein can include reflective learning aspects that inspire children to learn lessons based upon the required roles in each of the games that the children emulate.

The game systems and methods described herein can be physically interactive, such that there is a two-way flow of information between each game and its user that requires physical movement of the player with the new pieces and cards described in more detail below.

FIG. 1 is a schematic of a system 100. System 100 provides a non-consequential, intuitively educational, physically interactive game that promotes reflective learning. In the embodiment shown in FIG. 1, system 100 includes signs 102A and 102B, card deck 104, and soccer ball 106.

In alternative embodiments, system 100 need not be a soccer training system. Rather, system 100 could be a training system for a variety of sports in various embodiments. For example, system 100 could be a training system for tennis, lacrosse, croquet, floor hockey, baseball, football, badminton, basketball, golf, volleyball, or other sports, yard games, and role playing games, in embodiments. In some embodiments, system 100 is not limited to conventional sports, but instead could be themed. For each of these sports or themes, among others, system 100 can be used for education and physical fitness training of its users as described in more detail below.

Signs 102A and 102B are lawn signs, in the embodiment shown in FIG. 1. More generally, signs 102A and 102B can be indicators for different objects or targets within system 100. For example, signs 102A and 102B can include posters, flags, 3D objects or statutes, lights, podiums, or any other such marker. As shown in FIG. 1, sign 102A has a different pattern than sign 102B. A participant in the game or system 100 relies upon the differences between the patterns, shapes, or colors on each sign (102A, 102B) to indicate different stations or positions in the game.

In embodiments, there can be any number of signs (e.g., 102A and 102B) depending on the complexity of the game and the number of players. For example, in a larger game there can be ten or twenty signs (e.g., 102A and 102B) or even more. In some embodiments, each sign is different from the other signs. In other embodiments, subsets of the signs can be the same. For example, in one embodiment a system can include a set of several blue signs, a set of several red signs, and a set of several green signs. In embodiments, the indicator on the sign is not a color but rather a recognizable shape. For example, the indicator on the signs can include an animal, a number, a food, a picture of a type of geography (e.g., lake, mountain, or beach)

Cards 104 are different from existing card decks or conventional decks of cards. Cards 104 can include patterns, shapes, or colors that correspond with signs 102A and 102B.

Soccer ball 106 can be used to go between signs 102A, 102B, based upon a corresponding card 104. In embodiments, cards 104 can be kept at a central location, such as with a coach in the middle of a circle. Participants using system 100 can receive a card 104, and take soccer ball 106 to the sign (102A, 102B) that corresponds with the card from cards 104 that he or she has received.

In embodiments, a coach can be positioned at each of the signs (e.g., 102A and 102B). In one embodiment a player must determine what is on the card (from cards 104), find the corresponding sign (e.g., 102A and 102B), and take the soccer ball 106 to that target sign. At that target sign, a new card from cards 104 is given to the player, and he or she must go to the next sign.

System 100 operating in this way forces a player to use multiple skill sets in an intuitive way. The player matches shapes, colors, or objects to move between the stations. Each player can have a soccer ball 106 so that system 100 is inherently non-competitive, as each player moves at his or her own speed. Furthermore, in the soccer embodiment shown in FIG. 1, the player is holding a card from cards 104, and therefore the player must use his or her feet to move the ball because the player's hands are engaged with holding his or her card. Furthermore, the player must look up rather than looking down at the ball while dribbling, both in order to move towards the next target sign and to avoid one or more other players who may be attempting to steal the ball 102.

System 100 can easily be made more complex or more simple for different intended groups of players. For example, in some embodiments the cards 104 can be more abstractly related to the signs 102A, 102B. In one embodiment, the cards could be foods and the signs could be animals. A player would need to know to take the banana card to the monkey sign, or the fish card to the seal sign, for example. System 100 can also be made more complex or difficult by adding more signs that are spaced apart from one another. In one embodiment the signs can be arranged in a pattern such as a circle, or in more complicated systems the signs can be arranged in a non-geometric pattern so that the players must look around for the target sign.

In embodiments, additional components could be added to system 100. As described above, additional cards or signs could be used to increase the complexity of the game. Furthermore, additional objects can be used for rewards. In an embodiment described above, cards 104 show foods that are brought to corresponding signs that depict animals that eat those foods. In one embodiment, taking the banana card to the monkey sign might correspond to receiving a banana as a reward, and taking the fish card to the seal sign could correspond to receiving a sticker that looks like a seal.

An additional embodiment will be described in more detail below corresponding to a system for playing the game of "Gator Stew." In the embodiment described with respect to FIGS. 2-6, the system includes 16 soccer balls, six of each of twelve types of cards, twelve of each of four types of alligator or crocodile props, a soccer net, and ten distinct signs. In alternative embodiments for more players or variations on the game, different numbers of each could be used.

In one version of the game of Gator Stew, each player is a marine biologist. The player's job is to protect the fish (the soccer ball) from the gators. Two coaches participate, one as a gator and the other handing out cards (e.g., cards 104) to the players.

Figure 2:
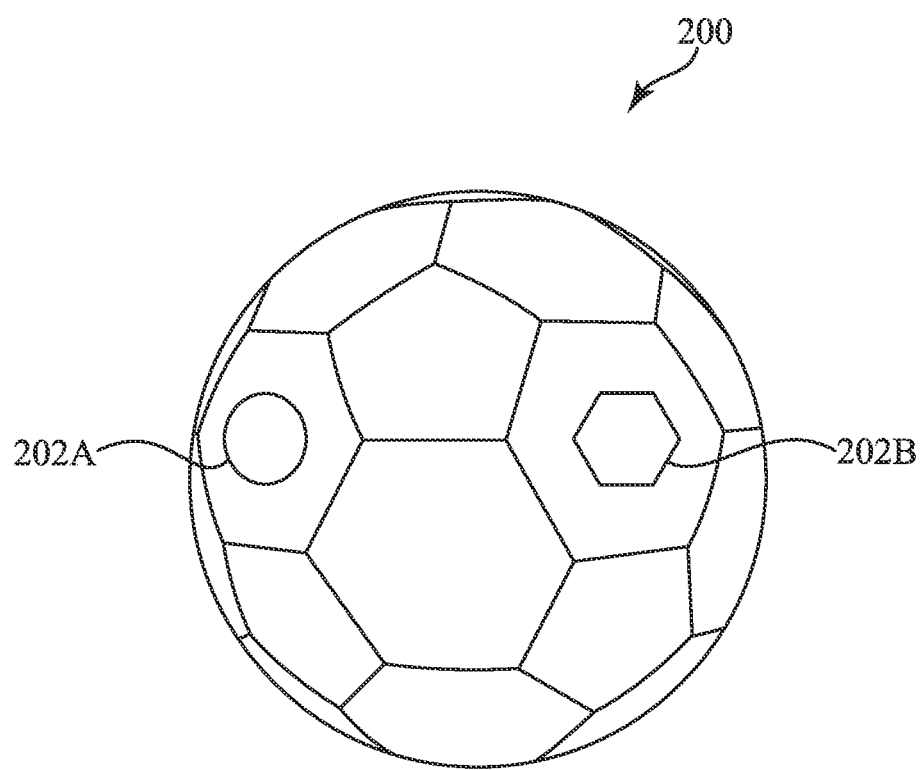
FIG. 2 is a component of a system according to an embodiment.

FIG. 2 shows soccer ball 200. Soccer ball 200 can be a standard, regulation-sized soccer ball. Alternatively, especially for games or systems in which smaller children will participate, a smaller-than-regulation soccer ball can be used. In the embodiment shown in FIG. 2, soccer ball 200 includes labels 202A, which can be stickers or painted onto soccer ball 200. By labeling soccer ball 200 in this way, a participant such as a small child may associate the ball with the fish that are being moved in the game. In one game, the coach can tell the players that the fish should stay in the water, so lifting soccer ball 200 off of the ground will make it so that the fish cannot breathe. Labels 202A and 202B are reminders that make the game intuitive for small children and promote dribbling the ball with the players' feet rather than picking up the ball.

Figure 3:
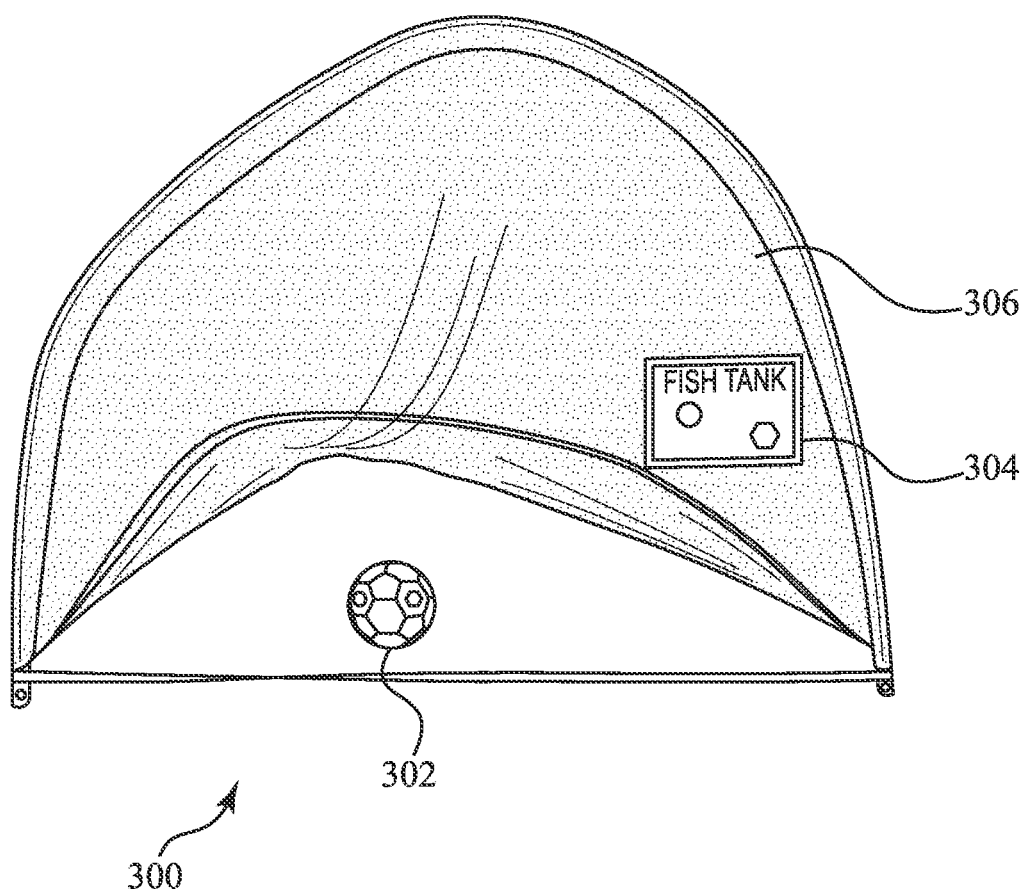
FIG. 3 shows three components of a system according to an embodiment.

FIG. 3 depicts a station 300 including a ball 302, sign 304, and net 306. Station 300 can be a part of a larger system (e.g., system 100). Ball 302 is similar to soccer ball 200 described above with respect to FIG. 2. Sign 304 is an indicator for a player for where to take ball 302. In embodiments, such there can be just one net 306, or alternatively systems can include multiple stations 300 each having a different sign 304 some of which may have identical indicators, and some of which may have different indicators.

Figure 4:
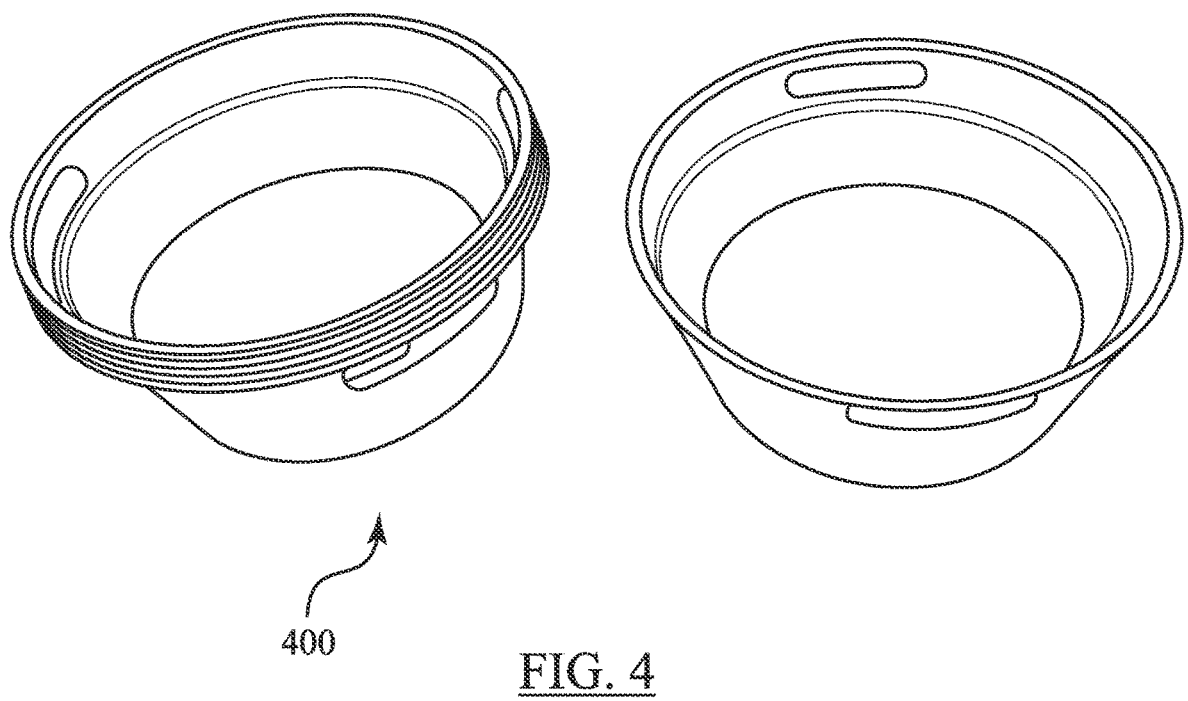
FIG. 4 shows two components of a system according to an embodiment.

FIG. 4 shows buckets 400 that can be used in embodiments to collect props or cards. Buckets 400 can be different colors or sizes for different games or exercises. In embodiments, buckets 400 can be labeled by color, size, pattern, or with an image corresponding to a card or prop.

Figure 5:
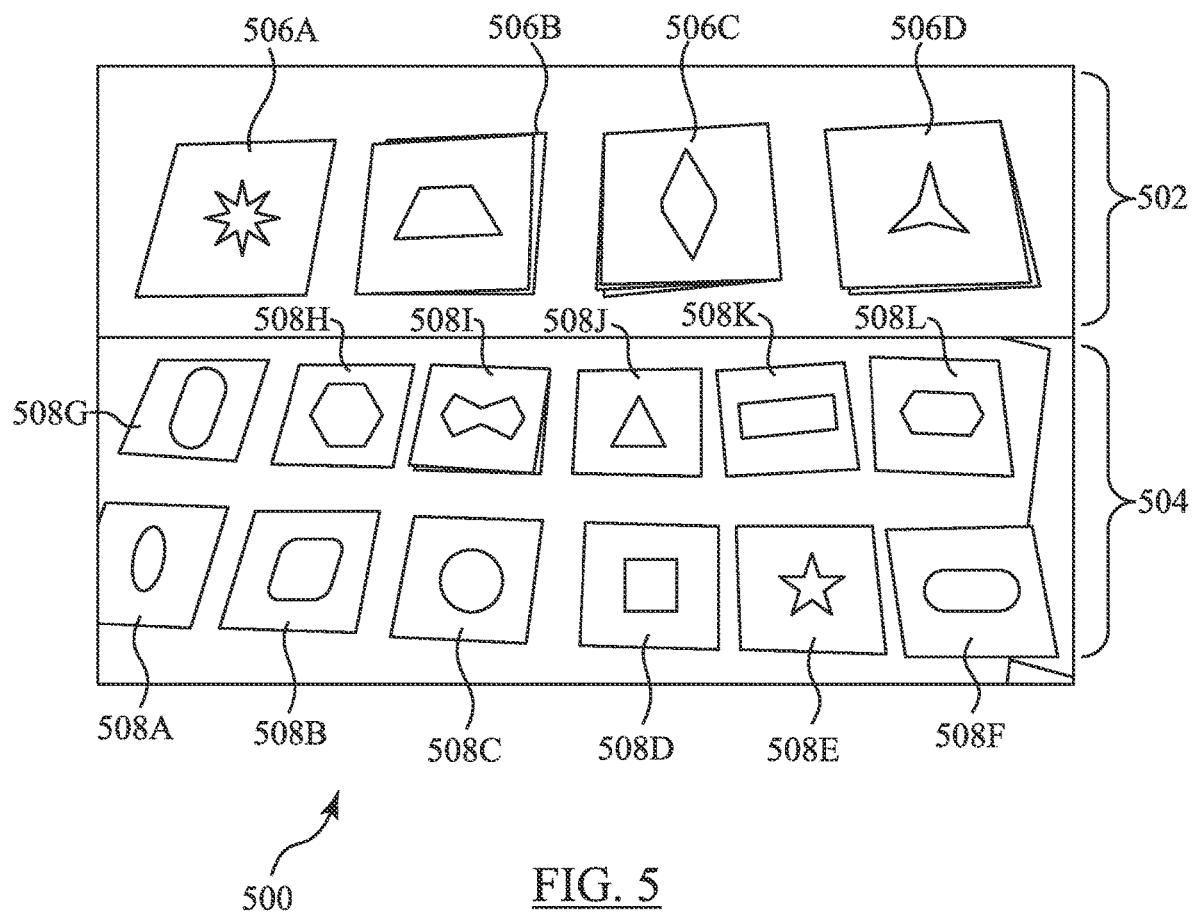
FIG. 5 shows a new and original deck of cards associated with the system of FIG. 1.

FIG. 5 shows cards 500 that can be used in one embodiment of a system. For example, cards 500 could be used as the cards 104 of system 100. Cards 500 are split into two categories in the embodiment shown in FIG. 5. Category 502 includes alligator or crocodile cards (506A, 506B, 506C, 506D), while category 504 includes fish cards (508A, 508B, 508C, 508D, 508E, 508F, 508G, 508H, 508I, 508J, 508K, 508L). In alternative embodiments, more categories could be used, or there could be more or fewer cards within each category. In embodiments, some or all of the cards within each category (502, 504) could instead be objects such as a stuffed or plastic object that has a shape or color that will be associated with a corresponding sign or bucket.

Figure 6:
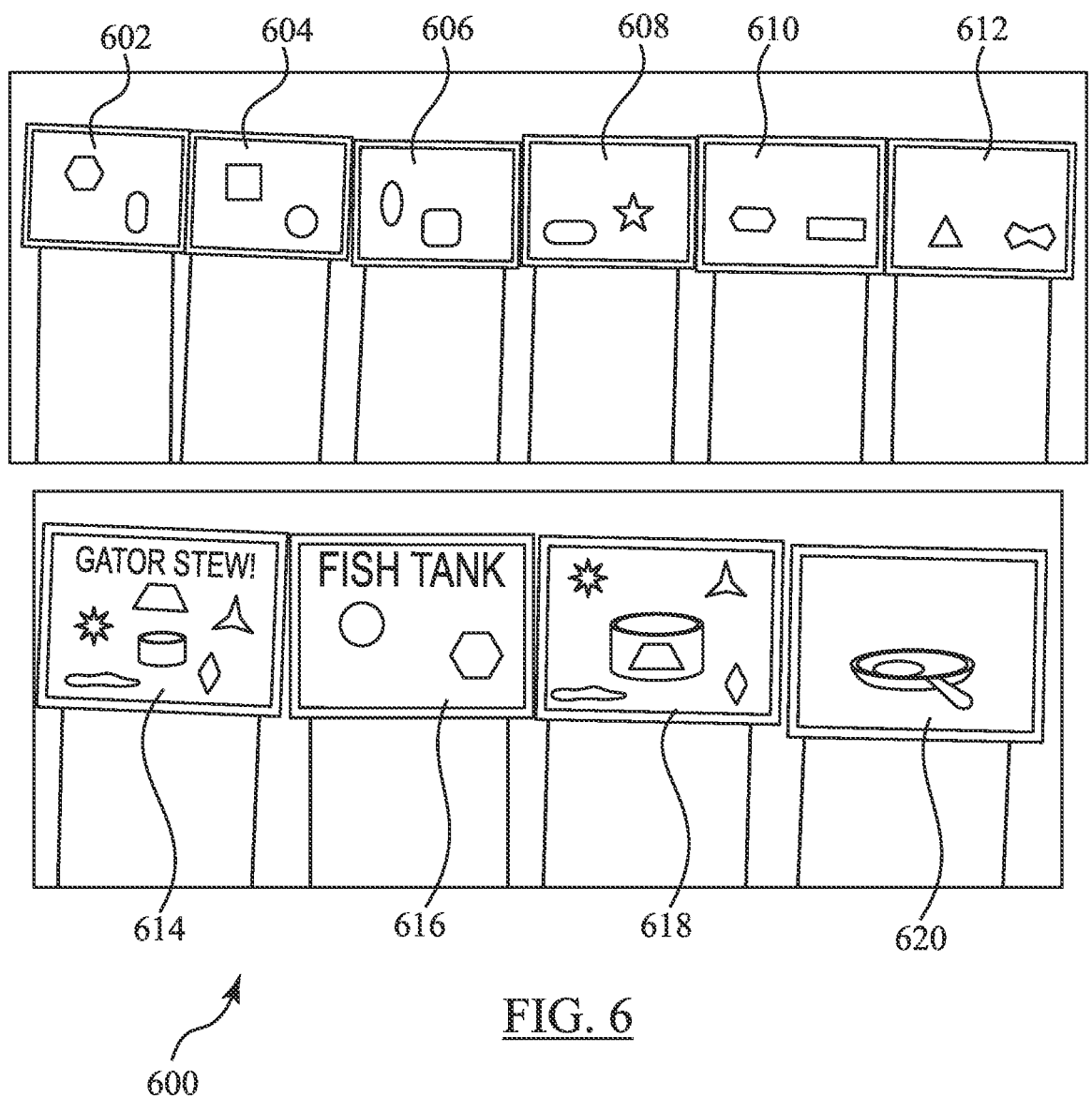
FIG. 6 shows a new and original set of components for a game system according to an embodiment.

FIG. 6 depicts a set of signs 600. The set 600 includes a plurality of individual signs having different types. In the embodiment shown in FIG. 6, set 600 includes sign 602, sign 604, sign 606, sign 608, sign 610, sign 612, sign 614, sign 616, sign 618, and sign 620. Each of the signs 602-620 includes a different image. Signs 602-612 each show a different environment in which fish can live, corresponding to different habitats or types of lakes and ponds. For example, lake 602 is labeled "lake happy fish," lake 604 is labeled "cool fish lake," lake 606 is labeled "lake big fish," lake 608 is labeled "lake little fish," lake 610 is labeled "lake crazy fish," and lake 612 is labeled "lake serenity." Sign 614 is a "gator stew" sign, sign 616 is a "fish tank" sign, sign 618 is a stewpot sign, and sign 620 is a frying pan sign. Each of these signs 602-620 can be used in various embodiments of the Gator Stew game. In alternative embodiments relating to other games, different signs could be used as described above that show different animals, buildings, or foods, among others, that can be used to direct players between various parts of the game.

In the Gator Stew game, a series of balls 200 are positioned within the net 306. Each player retrieves a ball 200 (representing a fish) from net 306. Players collect a card (e.g., one of cards 104, or one of the cards from the categories 502 and 504). Each player then attempts to take the ball 200 to the sign (102A, 102B, 602-620) corresponding to the card that he or she has picked. Picking up the ball 200 is forbidden because the ball represents the fish, and cannot be "out of water" (off the ground). In embodiments, a coach or another player can be the "gator" attempting to take fish (ball 200) from each player. The player attempts to move the ball 200 to the corresponding sign (e.g., 102A, 102B, 602-620) before the gator can steal it.

Once the player reaches the sign (e.g., 102A, 102B, 602-620) at a station (300), he or she can leave the card (e.g., 104, or one of the cards from the categories 502 and 504) at the corresponding station (e.g., 300). After the card is at the station, the player can return to the starting position to receive another card, or a card may be present at the station directing the player to another station.

If the player's ball 200 is stolen by the coach or other player acting as the gator, and the gator successfully takes the ball 200 all the way to the frying pan sign 618, then the player is temporarily "out" and may have to complete some other task or activity in order to get back into the game.

Figure 7:
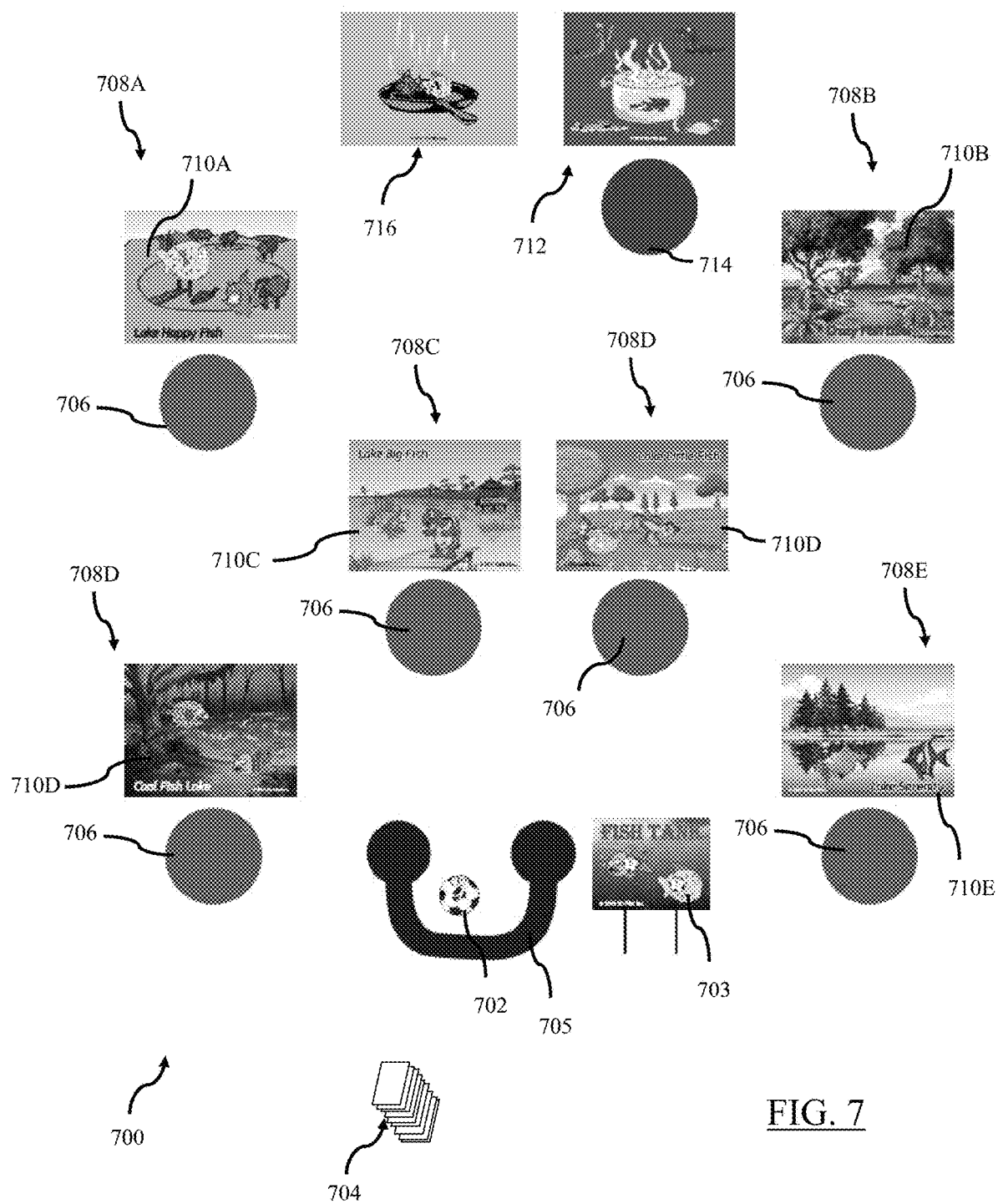
FIG. 7 is a schematic view of a system according to an embodiment.

FIG. 7 shows one embodiment of a field layout 700 according to an embodiment. FIG. 7 is a more complex version of the system 100 previously described with respect to FIG. 1. In the system 700 shown in FIG. 7, players attempt to travel with a ball 702 from the "fish tank" sign 703 to deliver cards 704 from net 705 to each of the buckets 706 adjacent stations 708A-708E. The stations 708A-708E each have a corresponding sign 710A-710E that matches one or more of the cards 704.

Meanwhile a "gator" player moves between the stations 708A-708E, attempting to steal the ball 702 for each player and dribble it to the stew pot 712 and its corresponding bucket 714. If the "gator" is successful in doing so, then the player whose ball 702 was stolen goes to the frying pan sign 716 for a period of time before rejoining the game.

The systems described herein are non-consequential in that all the players are working together to move the fish to their habitats rather than competing with one another. No player loses or faces consequences for being slower or less coordinated than other players. Alternative versions of the game can show other animals, or simulate completing tasks such as sorting recycling, delivering mail, returning lost items to their place, bringing food to hungry animals, or other themes. Signs 710A-710E can be modified, along with cards 704, to match the theme of each game. In each embodiment of the soccer system described herein, physical skills such as keeping the player's head up to look out for the gator and the location of the next station 708 are emphasized, as well as dribbling through traffic of other players. Other versions of the systems described herein will emphasize different skills. For example, a lacrosse version may emphasize hand-eye coordination and situational awareness.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A method for educating a child in a non-consequential, intuitive, reflective, and physically-interactive game, the method comprising:
   providing a plurality of signs, wherein subsets of the plurality of signs each present a different pattern;
   providing a plurality of cards, wherein some of the cards present a pattern corresponding to one or more of the plurality of signs;
   providing at least one ball;
   providing a net;
   arranging the signs remotely from one another;
   delivering a first one of the plurality of cards to the child at a first location; and
   delivering a second one of the plurality of cards to the child once the child has:
      moved one of the at least one balls to the one of the plurality of signs corresponding to the first one of the plurality of cards;
      deposited the first one of the plurality of cards in a bucket corresponding to the one of the plurality of signs;
      returned the one of the at least one balls to the net; and
      returned to the first location.

2. The method of claim 1, wherein before delivering the first one of the plurality of cards to the child, the at least one ball is positioned at the net.

3. The method of claim 1, wherein multiple children each receive a corresponding one of the plurality of cards to deliver to a corresponding one of the plurality of signs.

4. The method of claim 3, wherein the multiple children each deliver the cards at the same time.

5. The method of claim 4, wherein a coach moves among the plurality of signs and attempts to steal each of the balls from each of the multiple children, and wherein if the coach is successful in stealing the ball then the one of the plurality of cards provided to that child is deposited at a designated one of the plurality of signs.

6. The method of claim 1, wherein the patterns presented on each of the subsets of the plurality of signs is a color.

7. The method of claim 1, wherein the patterns presented on each of the subsets of the plurality of signs is a recognizable shape.

8. The method of claim 7, wherein each of the recognizable shapes is selected from the group consisting of an animal, a number, a food, or a picture of a type of geography.

9. The method of claim 8, wherein the plurality of cards present patterns having an abstract correspondence to the recognizable shape.

\* \* \* \* \*